Oct. 3, 1961    P. SCHÄFTER ET AL    3,002,427
ANAMORPHOTIC ATTACHMENT
Filed May 2, 1958

Inventors:
Paul SCHÄFTER
Kurt KIRCHHOFF
BY Karl F. Ross
AGENT

United States Patent Office 3,002,427
Patented Oct. 3, 1961

3,002,427
ANAMORPHOTIC ATTACHMENT
Paul Schäfter, Helmstedt, and Kurt Kirchhoff, Hamburg-Lurup, Germany, assignors to Isco Optische Werke G.m.b.H., Gottingen-Weende, Germany, a limited-liability company of Germany
Filed May 2, 1958, Ser. No. 732,590
Claims priority, application Germany June 13, 1957
3 Claims. (Cl. 88—57)

Our present invention relates to an optical system comprising a plurality of cylindrical lenses which form an afocal group, similar to a Galilean telescope, with a collective component on the image side and a dispersive component on the object side of the system. Optical systems of this character, with their cylinder axes usually positioned vertically in order to afford image expansion or contraction in a horizontal plane, are frequently used as anamorphotic front attachments for spherical photographic or projection objectives. These latter objectives, especially those used for picture taking, are generally of relatively short focal length and large image angle which necessitates a wide separation between the negative and positive components of an anamorphotic attachment consisting, in the conventional manner, of two or three air-spaced members. This, in turn, leads to an extremely strong curvature of the dispersive cylindrical front lens, with the extremities of this lens projecting unduly far beyond the plane of its vertex so that satisfactory correction of astigmatism, coma and distortion becomes extremely difficult for light rays converging at the upper and lower marginal zones of the projected image. Other, related drawbacks of these known systems are the great physical length and, in the case of wider field angles, the large lens diameters of the assembly, the considerable amount of glass involved, the weight, bulk and unwieldiness of the assembly, and the difficulty of finding room on conventional equipment to accommodate the attachment.

The general object of our present invention is to provide an improved optical system of the character set forth which avoids the disadvantages outlined above.

The anamorphotic system which we have devised, and which embodies the present invention, has four air-spaced cylindrical lens members including two negatively refracting front members and two positively refracting rear members. Advantageously, at least one of the collective rear members (preferably the one nearer the image plane) is a doublet.

An optical system of this description can be built with a field angle of about 60° and with a total physical length amounting to not more than about 60% of the focal length of the final collective member.

Another feature of our invention resides in the positioning of a concave rear face of the second dispersive member so close to a convex front face of the first collective member that the spacing between the vertices of these faces is a small fraction, not more than 10%, of the combined focal length of the two collective rear members together constituting the positive component of the system. This second dispersive member is advantageously a plano-concave lens and, for convenience of manufacture, may be identical in curvature, thickness and material with the first dispersive member immediately preceding it. The radius of curvature of the aforementioned concave face should at the same time be slightly shorter than that of the adjacent convex face so that the air space encompassed between these two faces is in the shape of a positive meniscus. With the first collective member advantageously designed as a plano-convex lens turning its flat face toward the image side of the system, the second collective lens member is preferably a plano-convex or concavo-convex doublet turning its face of shorter radius also toward the image side. The two lens elements which are cemented together to form the doublet should have indices of refraction differing by at least 0.05. Finally, the separation of the two collective members along their median plane should be not less than 8% and not greater than 25% of the focal length of the rearmost, collective member of the system.

By the observation of the dimensional and constitutive relationships just set forth we are able to provide an optical system which is satisfactorily corrected for aberrations, has limited axial and radial dimensions, and does not introduce objectionable vignetting, due to light-ray cutoff at the lens edges, while affording a wide angle of view.

The invention will be described in greater detail with reference to the accompanying drawing in which.

Figure 1:
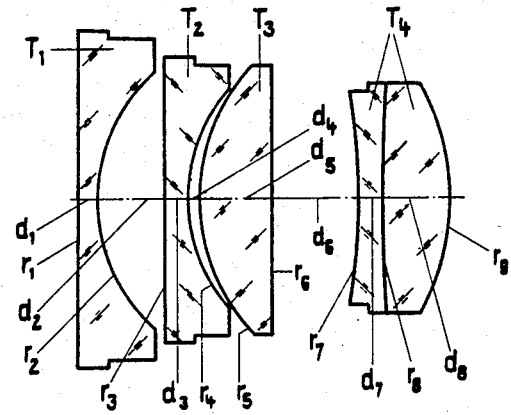
FIG. 1 shows an anamorphotic attachment according to the invention in a sectional view taken in the optically effective plane.
Figure 2:
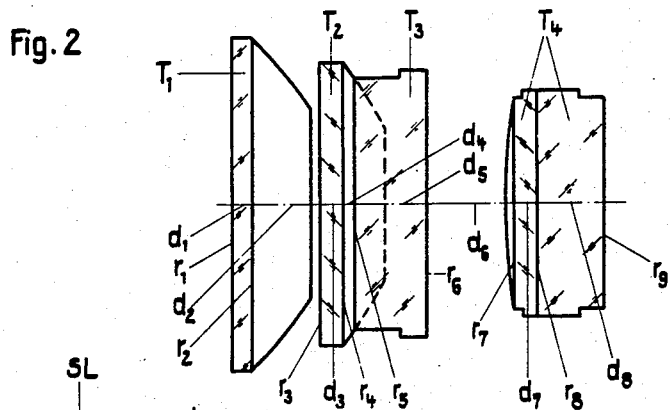
FIG. 2 is a sectional view of the same attachment taken in the optically ineffective plane.

The anamorphotic system shown in FIGS. 1 and 2 comprises a plano-concave first cylindrical lens member $T_1$, having radii $r_1$, $r_2$ and median thickness $d_1$, which is separated by an air space $d_2$ from a similar plano-concave lens member $T_2$ having radii $r_3$, $r_4$ and thickness $d_3$. These two members together constitute the dispersive component of the attachment. An air space $d_4$, in the shape of a positive meniscus, separates the negatively refracting member $T_2$ from a positively refracting, plano-convex cylindrical lens $T_3$ having radii $r_5$, $r_6$ and thickness $d_5$; an air space $d_6$ separates the member $T_3$ from its mate $T_4$ which is the final member of the group, the two members $T_3$, $T_4$ together constituting the collective component of the attachment. End member $T_4$ is shown as a doublet composed of a negative front lens (radii $r_7$, $r_8$ and thickness $d_7$) and, cemented thereto, a positive rear lens (radii $r_8$, $r_9$ and thickness $d_8$), its aspect in the view of FIG. 1 being that of a positive meniscus.

Preferred numerical values for the parameters $r_1$–$r_9$ and $d_1$–$d_8$ as well as the refractive indices $n_d$ of the lenses $T_1$–$T_4$ are given in the following table.

*Table I*

| lenses | radii | thicknesses and spacings | $n_d$ |
|---|---|---|---|
| $T_1$ | $r_1 = \infty$ | $d_1 = 4.95$ | 1.52 |
|  | $r_2 = +33.42$ | $d_2 = 13.85$ | air space |
| $T_2$ | $r_3 = \infty$ | $d_3 = 4.95$ | 1.52 |
|  | $r_4 = +33.42$ | $d_4 = 1.97$ | air space |
| $T_3$ | $r_5 = +38.24$ | $d_5 = 14.84$ | 1.65 |
|  | $r_6 = \infty$ | $d_6 = 17.01$ | air space |
| $T_4$ | $r_7 = -123.57$ | $d_7 = 4.80$ | 1.73 |
|  | $r_8 = +371.78$ | $d_8 = 13.43$ | 1.56 |
|  | $r_9 = -45.97$ | $d_9 = 1.50$ | air space |
|  |  | $d_{total} = 75.80$ |  |

The above numerical values are based upon the following values for the focal lengths $f_I$, $f_{II}$, $f_{III}$, $f_{IV}$ of the lens members $T_1$–$T_4$ and of the combined focal lengths $f_{I,II}$, $f_{III,IV}$ of the positive component $T_1$–$T_2$ and the negative component $T_3$–$T_4$, respectively, the ratio $f_{III,IV}/f_{I,II}$ giving an anamorphotic factor of approximately 2:

| | |
|---|---|
| $f_I = -64.27$ mm. | |
| $f_{II} = -64.27$ mm. | $f_{I,II} = -28.36$ mm. |
| $f_{III} = +58.83$ mm. | |
| $f_{IV} = +167.66$ mm. | $f_{III,IV} = +54.60$ mm. |

Figure 3:
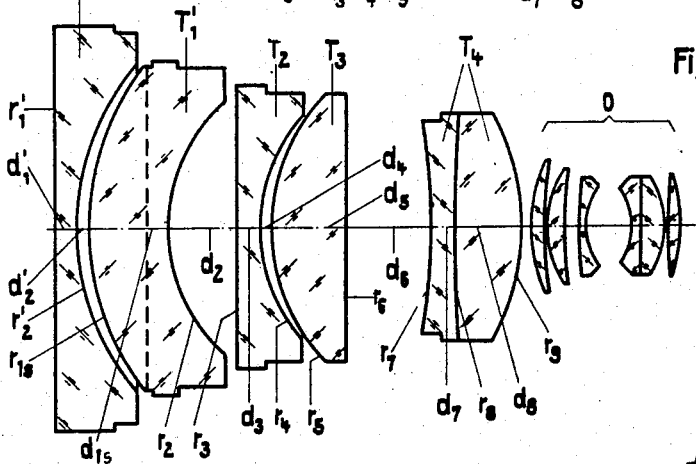
FIG. 3 is a view similar to FIG. 1, showing a modified attachment according to the invention in combination with a basic spherical objective associated therewith.

The system shown in FIGS. 1 and 2 can be utilized as a front attachment for a conventional spherical objective shown at O in FIG. 3. With the basic objective O focused on infinity, focusing adjustment can be carried out by means of a pair of relatively displaceable spherical lenses preceding the anamorphotic attachment. As taught in our co-pending application Ser. No. 638,151, filed February 4, 1957, now abandoned, one of these spherical lenses can be combined with the anamorphotic front member $T_1$ to form a partly cylindrical, partly spherical lens $T_1'$. This lens differs from front member $T_1$ of the preceding embodiment by the replacement of the plane face (radius $r_1$) of the latter with a spherically convex face of radius $r_{1s}$, resulting in an increase in lens thickness from $d_1$ to $d_{1s}$. At SL we have shown a spherically effective, plano-concave supplemental lens (radii $r_1'$, $r_2'$ and thickness $d_1'$) which forms an afocal couple with the forward face of lens $T_1'$ and whose axial spacing $d_2'$ therefrom is adjustable for focusing purposes. As also taught in our aforementioned co-pending application, the front face of lens $T_1'$ would be toric rather than spherical if the corresponding face of member $T_1$ had been cylindrical instead of plane.

Representative numerical values of the parameters of the attachment of FIG. 3 are given in the following table, the values of the unprimed radii $r_2$–$r_9$ and thicknesses and spacings $d_2$–$d_8$ being the same as in Table I.

*Table II*

| lenses | radii | thicknesses and spacings | $n_d$ |
|---|---|---|---|
| SL | $r_1' = \infty$ | $d_1' = 4.50$ | 1.51 |
| | $r_2'$ (spherical) $= +49.65$ | $d_2' = 2.20$ | air space |
| $T_1'$ | $r_{1s}$ (spherical) $= +52.22$ | $d_{1s} = 15.99$ | 1.52 |
| | $r_2$ (cylindrical) $= +33.42$ | $d_2 = 13.85$ | air space |
| $T_2$ | $r_3 = \infty$ | $d_3 = 4.95$ | 1.52 |
| | $r_4$ (cylindrical) $= +33.42$ | $d_4 = 1.97$ | air space |
| $T_3$ | $r_5$ (cylindrical) $= +38.24$ | $d_5 = 14.84$ | 1.65 |
| | $r_6 = \infty$ | $d_6 = 17.01$ | air space |
| $T_4$ | $r_7$ (cylindrical) $= -123.57$ | $d_7 = 4.80$ | 1.73 |
| | $r_8$ (cylindrical) $= +371.78$ | $d_8 = 13.43$ | 1.56 |
| | $r_9$ (cylindrical) $= -45.97$ | $d_9 = 1.50$ | air space |
| | | $d_{total} = 93.54$ | |

It will be noted that in each of the illustrated embodiments the total physical length $d_{total}$ of the system is well below 70% of the focal length $f_{IV}$ of lens member $T_4$, being about 50% thereof in the first case and approximately 60% in the second.

We claim:

1. An anamorphotic optical system comprising four air-spaced, cylindrically effective lens members having parallel axes of curvature, said lens members including a dispersive plano-concave first member on the object side of the system, a dispersive plano-concave second member following said first member, a collective plano-convex third member following said second member and a collective fourth member following said third member on the image side of the system; said first and second members constituting a first component of said system and said third and fourth members constituting a second component of said system; said first and second members having like median thicknesses, plane surfaces directed toward the object side of said system, and concave faces of like curvature directed toward the image side of said system; said third member having a convex face directed toward the object side of said system and a plane surface directed toward the image side of said system, the concave face of said second member and said convex face enclosing an air space in the shape of a positive meniscus, the median thickness of said air space being at most equal to substantially 10% of the focal length of said second component; and said fourth member comprising a first lens element and a second lens element cemented to said first lens element, the indices of refraction of said first and second lens elements differing by at least 0.05, said third and fourth members being separated by an air space ranging between substantially 8% and 25% of the focal length of said fourth member, said fourth member having a distinctly convex face turned toward the image side of the system and a non-convex face of larger radius of curvature averted from said image side.

2. An anamorphotic optical system comprising four air-spaced, cylindrically effective lens members having parallel axes of curvature, said lens members including a dispersive first member on the object side of the system, a dispersive second member following said first member, a collective third member following said second member and a collective fourth member following said third member on the image side of the system, said third member being separated from said second member by a relatively small axial distance and from said fourth member by a relatively large axial distance, said first member $T_1$, said second member $T_2$ and said third member $T_3$ being single lenses and said fourth member $T_4$ consisting of two lenses cemented together, the radii $r_1$–$r_9$, the median thicknesses and spacings $d_1$–$d_8$ and the refractive indices $n_d$ of all of said lenses having numerical values substantially as given in the following table:

| lenses | radii | thicknesses and spacings | $n_d$ |
|---|---|---|---|
| $T_1$ | $r_1 = \infty$ | $d_1 = 4.95$ | 1.52 |
| | $r_2 = +33.42$ | $d_2 = 13.85$ | air space |
| $T_2$ | $r_3 = \infty$ | $d_3 = 4.95$ | 1.52 |
| | $r_4 = +33.42$ | $d_4 = 1.97$ | air space |
| $T_3$ | $r_5 = +38.24$ | $d_5 = 14.84$ | 1.65 |
| | $r_6 = \infty$ | $d_6 = 17.01$ | air space |
| $T_4$ | $r_7 = -123.57$ | $d_7 = 4.80$ | 1.73 |
| | $r_8 = +371.78$ | $d_8 = 13.43$ | 1.56 |
| | $r_9 = -45.97$ | $d_9 = 1.50$ | air space |

3. An anamorphotic optical system comprising four air-spaced, cylindrically effective lens members having parallel axes of curvature, said lens members including a dispersive first member on the object side of the system, a dispersive second member following said first member, a collective third member following said second member and a collective fourth member following said third member on the image side of the system, said third member being separated from said second member by a relatively small axial distance and from said fourth member by a relatively large axial distance, said first member being provided with a spherically curved convex forward face; and a spherically effective plano-concave supplemental lens forming an afocal couple with said forward face, said supplemental lens being axially displaceable relatively to said lens members, said first member $T_1'$, said second member $T_2$ and said third member $T_3$ being single lenses and said fourth member $T_4$ consisting of two lenses cemented together, the radii $r_1'$ and $r_2'$ of said supplemental lens SL, its axial thickness $d_1'$, its spacing $d_2'$ from said forward face, the radius $r_{1s}$ of said forward face, the median thickness $d_{1s}$ of said first member and the remaining radii $r_2$–$r_9$ of all of said lenses, their median thicknesses and spacings $d_2$–$d_8$ and their refractive indices $n_d$ all having numerical values substantially as given in the following table:

| lenses | radii | thicknesses and spacings | $n_d$ |
|---|---|---|---|
| SL | $r_1' = \infty$ | $d_1' = 4.50$ | 1.51 |
|    | $r_2'$ (spherical) $= +49.65$ | $d_2' = 2.20$ | air space |
| $T_1'$ | $r_{1s}$ (spherical) $= +52.22$ | $d_{1s} = 15.99$ | 1.52 |
|    | $r_2$ (cylindrical) $= +33.42$ | $d_2 = 13.85$ | air space |
| $T_2$ | $r_3 = \infty$ | $d_3 = 4.95$ | 1.52 |
|    | $r_4$ (cylindrical) $= +33.42$ | $d_4 = 1.97$ | air space |
| $T_3$ | $r_5$ (cylindrical) $= +38.24$ | $d_5 = 14.84$ | 1.65 |
|    | $r_6 = \infty$ | $d_6 = 17.01$ | air space |
| $T_4$ | $r_7$ (cylindrical) $= -123.57$ | $d_7 = 4.80$ | 1.73 |
|    | $r_8$ (cylindrical) $= +371.78$ | $d_8 = 13.43$ | 1.56 |
|    | $r_9$ (cylindrical) $= -45.97$ | $d_9 = 1.50$ | air space |

References Cited in the file of this patent

UNITED STATES PATENTS

| | | |
|---|---|---|
| 1,829,634 | Chretien | Oct. 27, 1931 |
| 1,932,082 | Newcomer | Oct. 24, 1933 |
| 2,720,813 | Cox | Oct. 18, 1955 |
| 2,721,500 | Kohler et al. | Oct. 25, 1955 |
| 2,752,821 | Cook | July 3, 1956 |
| 2,821,110 | Cook | Jan. 28, 1958 |

FOREIGN PATENTS

| | | |
|---|---|---|
| Z–4058–IX/42h. | Germany | Dec. 22, 1955 |
| 335,864 | Great Britain | Oct. 2, 1930 |
| 1,082,780 | France | June 23, 1954 |